(12) United States Patent
Maeng (10) Patent No.: US 9,892,498 B1
(45) Date of Patent: Feb. 13, 2018

(54) SYSTEMS, METHODS, AND MEDIUMS FOR PRODUCING PANORAMIC IMAGES

(75) Inventor: Joon Maeng, Newcastle, WA (US)

(73) Assignee: INTELLECTUAL VENTURES FUND 79 LLC, Wilmington, DE (US)

( * ) Notice: Subject to any disclaimer, the term of this patent is extended or adjusted under 35 U.S.C. 154(b) by 788 days.

(21) Appl. No.: 12/983,859

(22) Filed: Jan. 3, 2011

(51) Int. Cl.
  *G06T 5/50* (2006.01)
(52) U.S. Cl.
  CPC ..................... *G06T 5/50* (2013.01)
(58) Field of Classification Search
  CPC .......................................... G06T 5/50
  USPC .... 348/36–39, 42, 50, 161, 169, 199, 207.1, 348/208.99, 335–399
  See application file for complete search history.

(56) References Cited

U.S. PATENT DOCUMENTS

| | | | |
|---|---|---|---|
| 5,557,358 A * | 9/1996 | Mukai et al. ............... 396/296 |
| 6,856,427 B1 * | 2/2005 | Gilman et al. .............. 358/1.9 |
| 7,136,096 B1 * | 11/2006 | Yamagishi et al. ......... 348/218.1 |
| 8,558,944 B2 * | 10/2013 | Makii ................ H04N 5/23245 |
| | | | 348/224.1 |
| 2002/0001036 A1 * | 1/2002 | Kinjo .......................... 348/231 |
| 2009/0028462 A1 * | 1/2009 | Habuka et al. .............. 382/284 |
| 2009/0185070 A1 * | 7/2009 | Murakami et al. ........... 348/363 |
| 2009/0245685 A1 * | 10/2009 | Makii .......................... 382/276 |
| 2010/0274978 A1 * | 10/2010 | Koike et al. .................. 711/154 |
| 2011/0157089 A1 * | 6/2011 | Rainisto ....................... 345/175 |
| 2011/0298965 A1 * | 12/2011 | Price ................... H04N 5/2351 |
| | | | 348/362 |

* cited by examiner

*Primary Examiner* — Jonathan Messmore
(74) *Attorney, Agent, or Firm* — Schwabe, Williamson & Wyatt (57) ABSTRACT

The present disclosure describes systems and methods for producing panoramic images. The systems and methods may include storing a first image in a memory device, overlapping a plurality of sections of the stored first image over corresponding portions of a second image such that the second image is visible between adjacent pairs of the plurality of sections in response to the plurality of sections and the second image being displayed on a display device, and aligning at least one of the plurality of sections of the first image with at least a portion of the second image prior to storing the second image.

40 Claims, 6 Drawing Sheets

SYSTEMS, METHODS, AND MEDIUMS FOR PRODUCING PANORAMIC IMAGES

TECHNICAL FIELD

The present disclosure is related to systems, methods, and mediums for producing images, such as panoramic images.

BACKGROUND

Known digital cameras are configured to produce panoramic images by dividing a scene in a plurality of images sequentially captured in one direction. Each of the plurality of images includes an overlapping section at an edge of the image that allows adjacent pairs of the images to be aligned to form the panoramic image. One disadvantage of known digital cameras is that the overlapping section may obscure a portion of the image that otherwise may be useful with respect to capturing a larger portion of the scene. Another disadvantage of known digital cameras is that a luminance, a chrominance, or a hue may change between sequential images because such sequential images are captured at different times and may be captured at different settings. Such changes adversely may affect the resulting panoramic image when adjacent pairs of the images are aligned to form the panoramic image.

DETAILED DESCRIPTION

Figure 1:
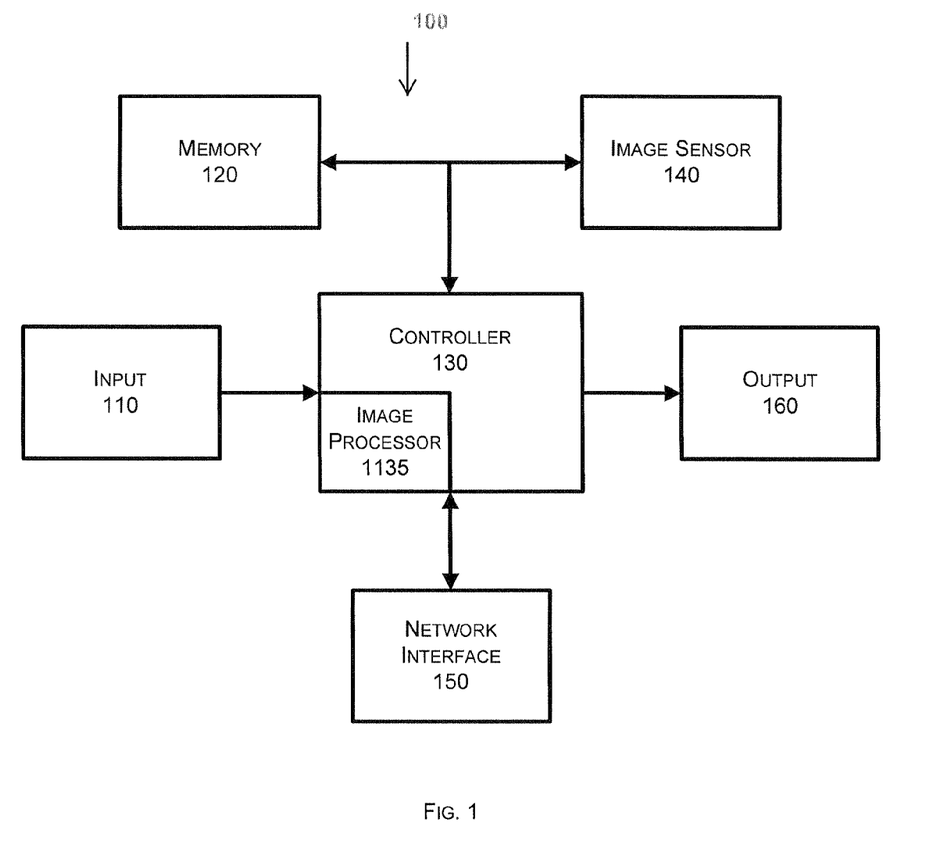
FIG. 1 depicts a block diagram of an exemplary system configured to produce panoramic images.

FIG. 1 is a block diagram of an exemplary system 100 that includes an input 110, a memory 120, a controller 130, an image processor 135, an image sensor 140, a network interface 150, and an output 160.

Input 110 may include any mechanism that is configured to provide input to or to control system 100 or controller 130. Input 110 may include any mechanism, such as buttons, toggle switches, wheels, touch screens, microphones, actuators, or the like, or any combinations thereof, that is configured to be enabled or actuated, either manually by a user or automatically by system 100, in response to signals, indications, stimuli, or the like, or any combination thereof.

Memory 120 may store instructions that, in response to execution by controller 130, cause controller 130 to perform operations for producing panoramic images. Memory 120 also may store still images or videos of live subjects. Memory 120 may include volatile and non-volatile memory devices, such as Random Access Memory (RAM), Dynamic Random Access Memory (DRAM), Static Random Access Memory (SRAM), flash memory, Read Only Memory (ROM), or the like, or any combination thereof.

Controller 130 may include one or more processing devices configured to operate or to control system 100. Controller 130 may be configured to read the instructions stored in memory 120, and to configure system 100 in a variety of ways.

Image sensor 140 may comprise a grid of capture devices, e.g., capacitors or transistors (not shown). Image sensor 140 may be configured to sense an image by converting light focused on the image into electrons that charge the capture devices. The more intense the light is at each capture device, the greater the charge accumulated in the capture device. Image processor 135 may read the charge at each capture device to generate a digital value representing brightness of a corresponding pixel in the image. Image processor 135 may include a device integral to controller 130 or a stand-alone device separate from controller 130. Image sensor 140 also may include a Charge Coupled Device (CCD) or Complementary Metal Oxide Semiconductor (CMOS) device.

To obtain a color image, system 100 also may include a beam splitter (not shown) configured to split the light into red, blue, and green components and to send each component to a corresponding grid of capture devices. One of ordinary skill in the art readily will understand that other methods of recording color in an image, such as using filters alone or in combination with algorithms, other circuits, or any combination thereof, may be employed.

Network interface 150 may connect, couple, or otherwise interface with system 100 via a wired or a wireless network. Network interface 150 may enable uploading of an image from system 100 to the wired or wireless network or enable downloading of images or other files or data, executable or otherwise, from the wired or wireless network. Network interface 150 further may enable updating firmware, drivers, and/or the like associated with system 100.

Output 160 may include any mechanism configured to allow system 100 to provide output to the wired or wireless networks, users, or the like, or any combination thereof. Output 160 may include a display configured to indicate a status of various settings of system 100, to display one or more of the images making up the panoramic image, or the like, or any combination thereof. Output 160 also may include speakers to generate sound, such as sound associated with various settings or status of system 100.

One of ordinary skill in the art readily will understand that a variety of devices, such as cameras, personal digital assistants, cellular phones, computers, or the like, and/or any other device, handheld or otherwise, digital or otherwise, that are capable of capturing an image, may be used to implement examples within contemplation of system 100.

Figure 2:
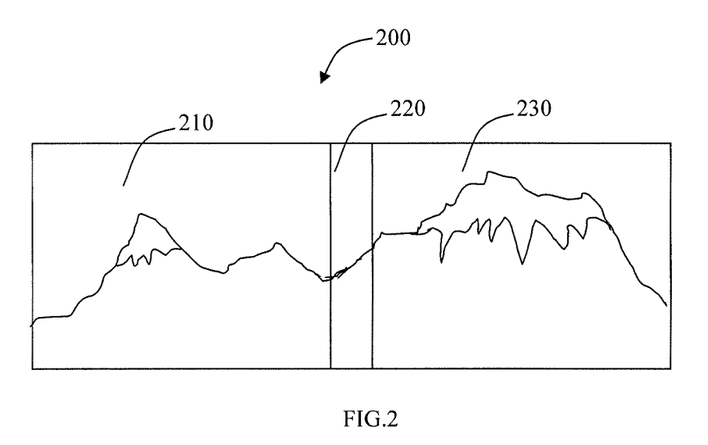
FIG. 2 depicts an example of a panoramic image including a plurality of sequential images.

FIG. 2 depicts an example of a panoramic image 200. Panoramic image 200 may include a first image 210 overlapping a second image 230. An overlapping column 220 may exist between, and be common to, first image 210 and second image 230. Overlapping column 220 may extend the right length of first image 210 and overlap the left length of second image 230, such that overlapping column 220 facilitates a user's alignment of first image 210 with second image 230 to generate panoramic image 200. A user may capture first image 210 and second image 230 sequentially as the user moves the device implementing system 100 from a first direction to a second direction, e.g., from left to right, right to left, up to down, down to up, or the like, or any combination thereof.

Figure 3:
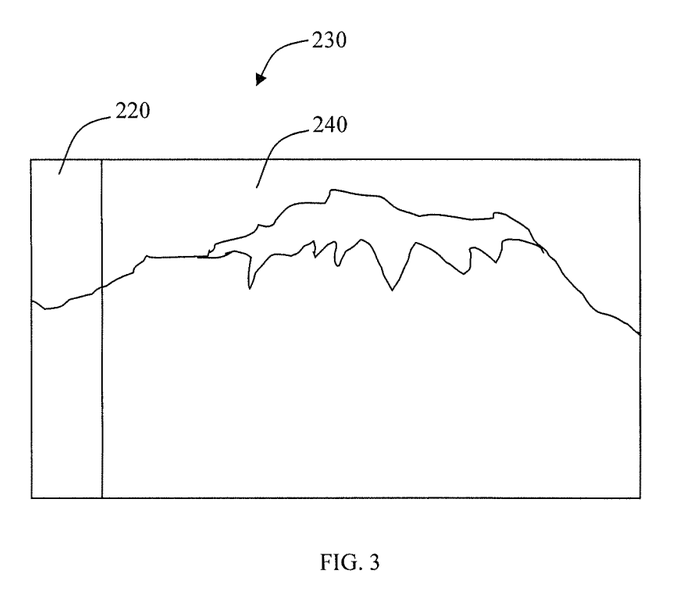
FIG. 3 depicts an example of an overlapping section of the image shown on FIG. 2, used to align sequential images.

FIG. 3 depicts an example of an overlapping column 220 of the image shown in FIG. 2, used to align sequential images. Referring to FIGS. 1-3, system 100 may produce panoramic image 200 in response to a panoramic image mode set by a user actuating any of inputs 110. When system 100 is in the panoramic image mode, system 100 automatically may display a portion of first image 210 that will overlap with second image 230 to enable visual alignment of the first image 210 and the second image 230. System 100 may display overlapping column 220 on output 160, e.g., the left length of the viewfinder of a device, after capturing first image 210. As such, system 100 may allow a user to align overlapping column 220 of the first image 210 with a portion 240 of second image 230. The user then may move the camera in various directions better to ensure that overlapping column 220 properly is aligned with portion 240.

Figure 4:
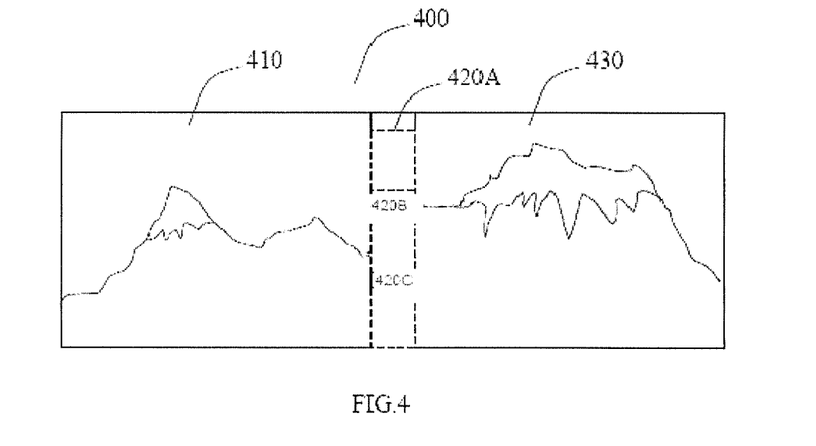
FIG. 4 depicts an example of a panoramic image including a plurality of sequential images.
Figure 5:
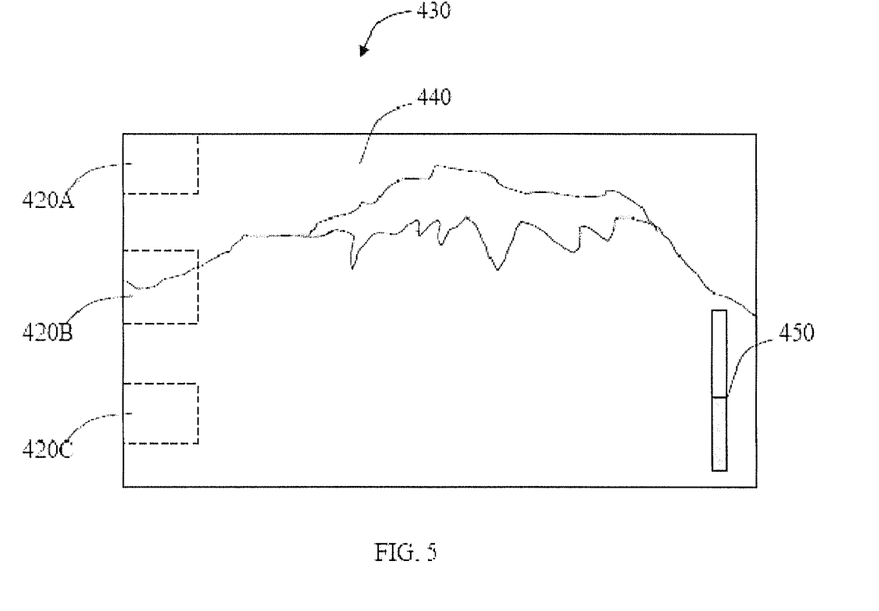
FIG. 5 depicts an example of a plurality of overlapping sections in the image shown in FIG. 4, used to align sequential images.

In an example, system 100 may be configured to produce a panoramic image 400, as shown in FIG. 4. Referring to FIGS. 1, 4, and 5, panoramic image 400 may include a first image 410 and a second image 430. A user of a device implementing system 100 may capture first image 410 in memory 120 and may display second image 430 on the output 160, e.g., a device's viewfinder (not shown), prior to capturing second image 430 in memory 120.

System 100 may display a plurality of sections 420A, 420B, and 420C of first image 410 overlapping second image 430 on output 160. Sections 420A, 420B, and 420C may overlap second image 430 such that at least a portion of second image 430 is visible between adjacent pairs of sections 420A, 420B, and 420C. FIGS. 4 and 5 show three sections 420A, 420B, and 420C, however, one of ordinary skill in the art readily will understand that examples including two sections and examples including more than three sections also are within the scope of the present disclosure. Second image 430 may be visible between adjacent pairs of plurality of sections 420A, 420B, and 420C, e.g., section 420A and section 420B, which may facilitate or enable a user's visual alignment of second image 430 with first image 410 in one or more axes, e.g., an x-axis, a y-axis, or a z-axis. As with image 200, a user may capture first image 410 and second image 430 sequentially as the user moves the device implementing system 100 from one direction to another direction, e.g., from a left to right direction, from a right to left direction, from an up to down direction, from a down to up direction, or any combination thereof.

System 100 may display first image 410, second image 430, or panoramic image 400, or any combination thereof, on output 160, e.g., the device's viewfinder.

In an example, system 100 may enable a user to manually adjust the exposure between first image 410 and second image 430 using an adjustment bar 450 alone or in combination with input 110. For example, the user may actuate an exposure adjustment by depressing a button on the device that increases or decreases the exposure of first image 410, second image 430, or sections 420A, 420B, and 420C, or any combination thereof. System 100 graphically may show the exposure adjustment by displaying adjustment bar 450 on output 160, e.g., the device's viewfinder. Alternatively, adjustment bar 450 may allow adjustment directly, e.g., with a graphical display of adjustment bar 450 on the device's screen that responds to a user's touch actuation. When system 100 is in a fixed shutter speed mode, system 100 may allow a user to change the aperture. When system 100 is in a fixed aperture mode, system 100 may allow the user to change the shutter speed.

System 100 may enable automatic exposure adjustment between first image 410 and second image 430. Referring to FIGS. 1 and 4-6, system 100 may divide a portion of first image 610 into a plurality of first subsections 611-619 and an overlapping portion of second image 620 into a plurality of second subsections 621-629. System 100 may or may not display the first subsections 611-619 or the second subsections 621-629 on output 160. In an example, corresponding pairs of first subsections 611-619 and second subsections 621-629 of first image 410 and second image 430, respectively, may be substantially identical in size. System 100 may measure a size of first subsections 611-619 and a size of second subsections 621-629 in pixels. System 100, e.g., controller 130 or image processor 135 of system 100, may calculate a brightness of each of first subsections 611-619 and each of second subsections 621-629. System 100 automatically may adjust an exposure of each of first subsections 611-619, each of second subsections 621-629, or any combination thereof, in response to comparing each of first subsections 611-619 to a corresponding one of second subsections 621-629. In one embodiment, system 100 automatically may adjust the exposure of each of first subsections 611-619, each of second subsections 621-629, or any combination thereof, by minimizing a difference in brightness between each of the plurality of first subsections 611-619 and the corresponding one of second subsections 621-629. For example, system 100 may calculate the brightness of pixels in first subsection 611 and the brightness of pixels in second subsection 621. In response to calculating a difference in brightness levels between first subsection 611 and corresponding second subsection 621, system 100 may adjust up or down the brightness for pixels in first subsection 611, the brightness for pixels in second subsection 621, or any combination thereof. System 100 also may calculate a brightness of individual pixels or an average brightness for pixels within first subsections 611-619 and/or with second subsections 621-629. Moreover, system 100 automatically may adjust a brightness of individual pixels or automatically may adjust a brightness of groups of pixels.

Figure 6:
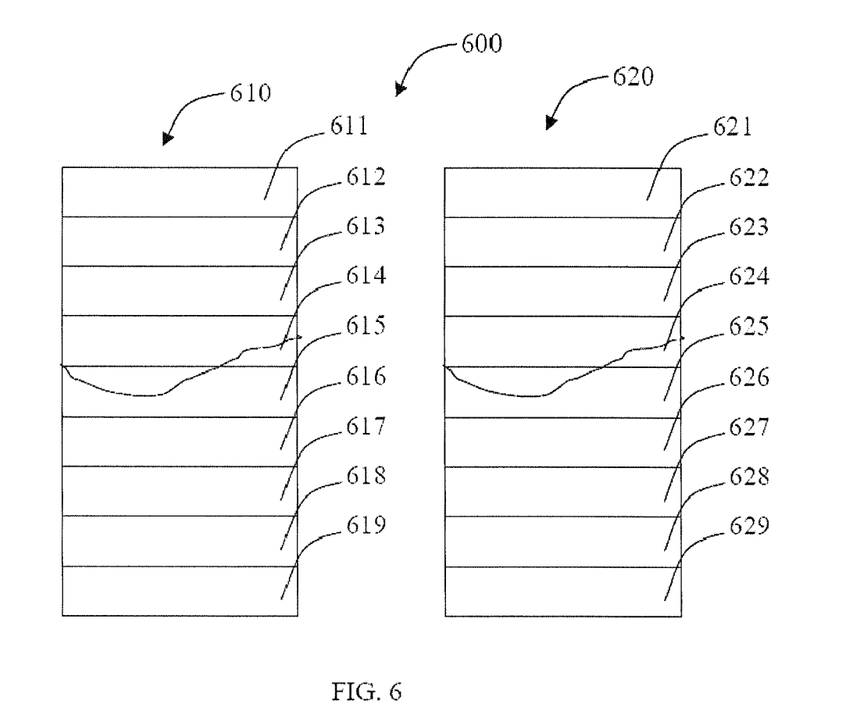
FIG. 6 depicts an example of an automatic exposure adjustment of sequential images.

Based on the foregoing, in one example, the brightness for each of first subsections 611-619 may correspond to an average brightness of pixels in first subsection 611-619, respectively, and may be represented by $B_I$. In this example, the brightness for each of second subsections 621-629 may correspond to an average brightness of pixels in second subsection 621-629, respectively, and may be represented by $B_J$. Moreover, a difference in brightness levels between first subsections 611-619 and second subsections 621-629 may be represented by the formula $\Sigma|(B_I-B_J)|$ or by the formula $\Sigma(B_I-B_J)^2$.

System 100 automatically may adjust an exposure of second image 430 to minimize the difference between corresponding pairs of first subsections 611-619 and second subsections 621-629, e.g., the difference between first subsection 611 and second subsection 621.

System 100 may or may not similarly size first section 610 and/or second section 620 with sections 420A, 420B, and 420C, for example, because first section 610 or second section 620 and/or sections 420A, 420B, and 420C may serve different purposes. System 100 may use first section 610 and second section 620 to automatically adjust exposure between two sequential images, e.g., first image 410 and second image 430. System 100 may use sections 420A, 420B, and 420C to enable aligning first image 410 with second image 430. System 100 may display or otherwise may make visible sections 420A, 420B, and 420C on output 160 to facilitate alignment. System 100 may not display first section 610 and/or second section 620 because system 100 may use first section 610 and/or second section 620 internally.

In an example, system 100 may assemble sequential images, e.g., first image 410 and image 430 and also may allow a user to adjust the luminance, the chrominance, the hue, or any combination thereof (collectively LCH), of each image individually or as displayed assembled as panoramic image 400. System 100 also may enable a user to switch display views from panoramic image 400 to individual images, e.g., first image 410 and/or second image 430 in response to actuation of input 110.

Figure 7:
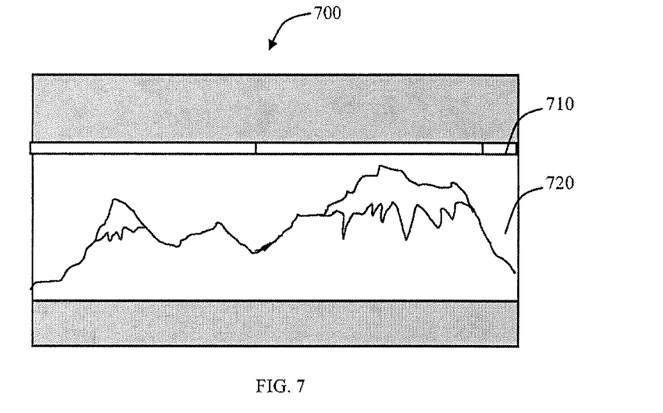
FIG. 7 depicts an example of a panoramic image, as displayed on a viewfinder.

FIG. 7 depicts an example of a panoramic image 720, as displayed on a display. Referring to FIGS. 1 and 4-7, system 100 may display the result of assembling sequential images that make up panoramic view 700. System 100 may display the panoramic image 720 with an indication of boundaries between individual sequential images using a boundary bar 710. In an example, system 100 also may indicate the boundaries between individual sequential images using lines or by identifying the individual sequential images with numbers, characters, or the like, or any combination thereof. System 100 further may enable a user to view panoramic image 720 on output 160 and may enable adjusting the LCH of each image to match adjacent images.

Figure 8:
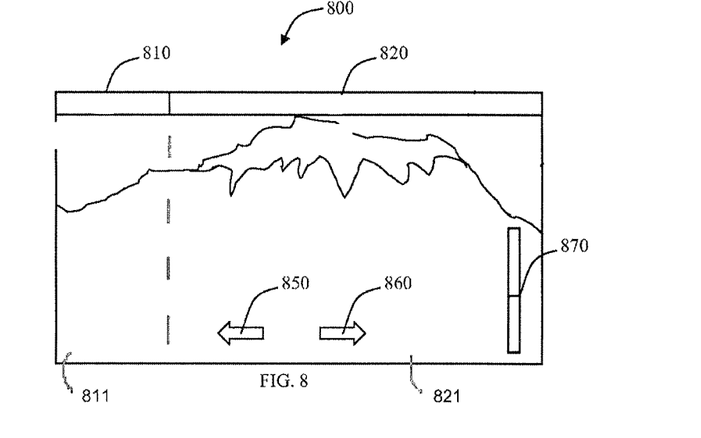
FIG. 8 depicts an example of an exposure adjustment of the panoramic image shown in FIG. 7.

FIG. 8 depicts an example of an exposure adjustment of a panoramic image 800, which may be similar to the image shown in FIG. 7. Referring to FIGS. 1 and 4-8, system 100 may display panoramic image 800 on output 160, e.g., a device's display, together with a first boundary bar 810 and a second boundary bar 820 indicating the boundaries between individual images 811 and 821 making up the panoramic image 800. System 100 additionally may enable a user to move an image displayed on output 160 by actuating a first arrow 850 or a second arrow 860 using input 110, e.g., a device button. For example, a main portion of the panoramic image 800 is shown as image 821, as indicated by boundary bar 820. System 100 may enable a user to adjust settings of the individual image 1 and image 2. For example, system 100 may enable a user to adjust a brightness of image 2 by actuating adjustment bar 870 using input 110. System 100 also may enable a user to select which component of image 821 the user wants to adjust by changing input 110. For example, in response to the user selecting to adjust luminance, adjustment bar 870 may reflect luminance of the image 821. System 100 also may enable replacement of an individual image with other, non-sequential, images.

The invention claimed is:

1. A method, comprising:
 capturing a first image in a memory device;
 before capturing a second image in the memory device:
  substantially simultaneously displaying a plurality of sections of the stored first image overlapping the second image such that the second image is visible between pairs of the plurality of sections;
  enabling aligning at least one of the plurality of sections of the first image with at least a corresponding portion of the second image; and
  automatically adjusting an exposure setting of each of the plurality of sections of the first image, each of a plurality of sections of the second image, or any combination thereof in response to comparing each of the plurality of sections of the first image to a corresponding one of the plurality of sections of the second image to minimize a difference in brightness between each of the plurality of sections of the first image and the corresponding one of the plurality of sections of the second image; and
 capturing the second image in the memory device using the automatically adjusted exposure setting.

2. The method of claim 1, further comprising enabling manual adjustment of the exposure setting via an interactive adjustment bar displayed on the display device overlapping the first image or the second image.

3. The method of claim 1, further comprising automatically changing an aperture setting in response to a shutter speed being fixed or automatically changing the shutter speed in response to the aperture setting being fixed.

4. The method of claim 1, wherein automatically adjusting the exposure setting further comprises:
 identifying a plurality of first subsections in the first image and a plurality of second subsections in the second image;
 comparing each of the plurality of first subsections to a corresponding one of the plurality of second subsections; and
 automatically adjusting the exposure setting between the first image and the second image based on a result of the comparison prior to storing the second image.

5. The method of claim 4, wherein comparing each of the plurality of first subsections to the corresponding one of the second subsections includes minimizing a difference in brightness between each of the plurality of first subsections and the corresponding one of the second subsections.

6. The method of claim 1, further comprising:
 generating a composite image by assembling the first image and the second image in response to the aligning after capturing the second image in the memory device; and
 displaying the composite image on the display device.

7. The method of claim 6, further comprising:
 enabling adjustment of at least one of luminance, chrominance, or hue associated with the first image or the second image in response to displaying the composite image on the display device.

8. The method of claim 6, further comprising:
 enabling replacement of the first image or the second image with a third image in response to the displaying.

9. The method of claim 6, wherein displaying includes displaying the composite image in response to a shutter release associated with capturing the second image.

10. An apparatus, comprising:
 a memory device configured to store a first image captured by an image sensor in response to a first shutter release;
 a display device configured to substantially simultaneously display a plurality of sections of the first image over at least portions of a second image such that the second image is visible only between adjacent pairs of the plurality of sections of the first image; and
 an image processing device configured to:
  enable alignment of at least one of the plurality of sections of the first image with at least a corresponding portion of the second image by allowing movement of the second image while the first image remains fixed and overlapping the second image;
  automatically adjusting an exposure setting of each of a plurality of sections of the second image in response to comparing the at least one of the plurality of sections of the first image with at least one of the plurality of sections of the second image to minimize a difference in brightness between the at least one of the plurality of sections of the first image and the at least one of the plurality of sections of the second image; and storing the second image in the memory device using the automatically adjusted exposure setting in response to a second shutter release.

11. The apparatus of claim 10, wherein the image sensor comprises a charge-coupled device.

12. The apparatus of claim 10, further comprising a network interface configured to interface with at least one of a wireless or a wired network.

13. The apparatus of claim 10, wherein the image processing device is further configured to enable alignment of at least one of the plurality of sections of the first image with the at least the corresponding portion of the second image in response to movement of the apparatus.

14. The apparatus of claim 10, wherein the image processing device is further configured to enable manual adjustment of the exposure setting using an interactive adjustment bar displayed on the display device.

15. The apparatus of claim 10, wherein the image processing device is further configured to automatically change an aperture setting in response to a shutter speed being fixed or to automatically change the shutter speed in response to the aperture setting being fixed.

16. The apparatus of claim 10, wherein the image processing device is further configured to:
identify a plurality of first subsections in the first image and a plurality of second subsections in the second image;
compare each of the plurality of first subsections to a corresponding one of the second subsections; and
automatically adjust the exposure setting between the first image and the second image based on a result of the comparison prior to storing the second image in the memory device.

17. The apparatus of claim 16, wherein the image processing device is further configured to minimize a difference in brightness between each of the plurality of first subsections and the corresponding one of the second subsections.

18. The apparatus of claim 10, wherein the image processing device is further configured to:
generate a composite image by assembling the first image and the second image in response to the alignment; and
display the composite image on the display device.

19. The apparatus of claim 18, wherein the image processing device is further configured to:
enable adjustment of at least one of luminance, chrominance, or hue associated with the first image or the second image in response to displaying the composite image on the display device.

20. The apparatus of claim 18, wherein the image processing device is further configured to:
enable replacement of the first image or the second image with a third image in response to displaying the composite image on the display device.

21. An apparatus, comprising:
a memory device configured to:
store instructions;
store a first image in response to a first shutter release; and
a processing device configured to execute the instructions stored in the memory device to:
substantially simultaneously display a plurality of sections of the first image over at least portions of a second image such that the second image is visible only between adjacent pairs of the plurality of sections of the first image;
enable alignment of at least one of the plurality of sections of the first image with at least a corresponding portion of the second image by allowing movement of the second image while the first image remains fixed and overlapping the second image;
automatically adjust an exposure setting of each of a plurality of sections of the second image in response to comparing the at least one of the plurality of sections of the first image with at least one of the plurality of sections of the second image to minimize a difference in brightness between the at least one of the plurality of sections of the first image and the at least one of the plurality of sections of the second image; and
wherein the memory device is configured to store the second image using the automatically adjusted exposure setting in response to a second shutter release.

22. The apparatus of claim 21, wherein the processing device is configured to execute the instructions stored in the memory device further to:
enable manual adjustment of the exposure setting between the first image and the second image in response to comparing at least one of the plurality of sections with the corresponding portion of the second image.

23. The apparatus of claim 22, wherein the processing device is configured to execute the instructions stored in the memory device further to:
enable manual adjustment of the exposure setting via an interactive adjustment bar displayed on the display device.

24. The apparatus of claim 22, wherein the processing device is configured to execute the instructions stored in the memory device further to:
automatically change an aperture setting in response to a shutter speed being fixed or automatically change the shutter speed in response to the aperture setting being fixed.

25. The apparatus of claim 21, wherein the processing device is configured to execute the instructions stored in the memory device further to:
identify a plurality of first subsections in the first image and a plurality of second subsections in the second image;
compare each of the plurality of first subsections to a corresponding one of the plurality of second subsections; and
automatically adjust the exposure setting between the first image and the second image based on the comparison.

26. The apparatus of claim 25, wherein the processing device is configured to execute the instructions stored in the memory device further to:
minimize a difference in brightness between each of the plurality of first subsections and the corresponding one of the second subsections.

27. The apparatus of claim 21, wherein the processing device is configured to execute the instructions stored in the memory device further to:
generate a composite image by assembling the first image and the second image in response to the aligning; and
enable display of the composite image on the display device.

28. The apparatus of claim 27, wherein the processing device is configured to execute the instructions stored in the memory device further to:

adjust at least one of luminance, chrominance, or hue associated with the first image or at least portions of the second image in response to displaying the composite image on the display device.

29. The apparatus of claim 27, wherein the processing device is configured to execute the instructions stored in the memory device further to:
enable replacement of the first image or the second image with a third image in response to displaying the composite image on the display device.

30. The apparatus of claim 27, wherein the processing device is configured to execute the instructions stored in the memory device further to:
enable display of the composite image in response to the second shutter release associated with the storing of the second image.

31. A computer readable storage device comprising executable instructions stored thereon that configure a processing device to perform operations comprising:
storing a first image in a memory device in response to a first shutter release;
substantially simultaneously displaying a plurality of sections of the stored first image overlapping a second image such that the second image is visible between pairs of the plurality of sections;
enabling aligning at least one of the plurality of sections of the first image with a corresponding portion of the second image by allowing movement of the second image while the first image remains fixed and overlapping the second image;
automatically adjusting an exposure setting of each of a plurality of sections of the second image in response to comparing the at least one of the plurality of sections of the first image with at least one of the plurality of sections of the second image to minimize a difference in brightness between the at least one of the plurality of sections of the first image and the at least one of the plurality of sections of the second image; and
storing the second image in the memory device using the automatically adjusted exposure setting in response to a second shutter release.

32. The computer readable storage device of claim 31, wherein the processing device is configured to perform operations further comprising:
enabling manual adjustment of the exposure setting between the first image and the second image in response to comparing at least one of the plurality of sections with the corresponding portion of the second image.

33. The computer readable storage device of claim 32, wherein the processing device is configured to perform operations further comprising:
enabling manual adjustment of the exposure setting via an interactive adjustment bar displayed on the display device.

34. The computer readable storage device of claim 32, wherein the processing device is configured to perform operations further comprising:
automatically changing an aperture setting in response to a shutter speed being fixed or automatically changing the shutter speed in response to the aperture setting being fixed.

35. The computer readable storage device of claim 31, wherein the processing device is configured to perform operations further comprising:
identifying a plurality of first subsections in the first image and a plurality of second subsections in the second image;
comparing each of the plurality of first subsections to a corresponding one of the plurality of second subsections; and
automatically adjusting the exposure setting between the first image and the second image based on a result of the comparison.

36. The computer readable storage device of claim 35, wherein the processing device is configured to perform operations further comprising:
minimizing a difference in brightness between each of the plurality of first subsections and the corresponding one of the second subsections.

37. The computer readable storage device of claim 31, wherein the processing device is configured to perform operations further comprising:
generating a composite image by assembling the first image and the second image in response to the aligning; and
displaying the composite image on the display device after storing the first image and the second image in the memory device.

38. The computer readable storage device of claim 37, wherein the processing device is configured to perform operations further comprising:
enabling adjustment of at least one of luminance, chrominance, or hue associated with the first image or the second image in response to displaying the composite image on the display device.

39. The computer readable storage device of claim 37, wherein the processing device is configured to perform operations further comprising:
enabling replacement the first image or the second image with a third image in response to displaying the composite image on the display device.

40. The computer readable storage device of claim 37, wherein the processing device is configured to perform operations further comprising:
displaying the composite image in response to the second shutter release associated with the storing of the second image.

* * * * *